April 8, 1947.  E. D. TILLYER  2,418,489
GLASS ANNEALING
Filed Aug. 1, 1942  2 Sheets-Sheet 1

INVENTOR
EDGAR D. TILLYER
BY Louis L. Gagnon
ATTORNEY

Patented Apr. 8, 1947

2,418,489

UNITED STATES PATENT OFFICE 2,418,489

GLASS ANNEALING

Edgar D. Tillyer, Southbridge, Mass., assignor to American Optical Company, Southbridge, Mass., a voluntary association of Massachusetts Application August 1, 1942, Serial No. 453,152

1 Claim. (Cl. 49—89)

This invention relates to glass annealing and has particular reference to a novel method of obtaining a fine annealing.

One of the principal objects of the invention is to provide a glass having the utmost uniformity of index of refraction and utmost stability of said index with respect to time.

A further object is to provide a glass which has the maximum index obtainable for its given composition.

Another object is to obtain the temperature required for fine annealing of a particular glass by an accurate, rapid and simple method.

Another object is to obtain the upper temperature at which annealing is started for the most rapid removal of strain prior to arriving at a critical lower temperature required for annealing, whereby the glass will retain its inherent shape.

Another object is to provide a novel method of obtaining the temperature range through which the annealing takes place, giving the maximum temperature at which said annealing is started and the minimum temperature at which the annealing is finished.

Another object is to provide simple, efficient and economical means of obtaining the maximum temperature at which annealing may be started without distortion taking place in the glass.

Another object is to provide simple, efficient and economical means of obtaining the highest temperature at which maximum compacting of the glass atoms will occur, which highest temperature is the lowest temperature required in the annealing cycle and also to obtain the temperature at which the annealing may be stopped.

A further object is to obtain the temperature range within which the annealing is to take place for maximum efficiency of annealing of a particular glass.

Another object is to provide glass, particularly applicable in all cases where the glass or the article made from the glass is to be subjected to the action of heat or changes in temperature such as for heat screens in lens systems for projection apparatus or for lenses or optical units used in such optical systems in any cases where they are subjected to heat or temperature changes.

Other objects and advantages will become apparent from the following description taken in connection with the accompanying drawings and it will be apparent that many changes may be made in the procedures and methods set forth herein without departing from the spirit of the invention as expressed in the accompanying claim. It, therefore, is not desired that the invention be limited to the exact procedures and methods set forth as the preferred forms only have been given by way of illustration.

Annealing of glass originally was considered to be the removal of strain as shown by polariscopic tests. Research has found that this was not enough; that strain-free glass could be obtained which was not well annealed or completely compacted and such glass would change after years of service. Further research showed that by heating a piece of glass and measuring its index of refraction from time to time, that this index of refraction would change, depending upon its temperature treatment, and some showed glass heated for many hundreds of hours would reach a maximum index. The previous way of attempting to anneal the glass was to put specimens in furnaces at different temperatures, hold them for many hundreds of hours at these temperatures, then measure the index of the glass. The temperature at which one of these specimens reached the maximum index that this glass was capable of reaching in the shortest possible time was considered to be the compacting temperature or the temperature of maximum anneal. It was very difficult to carry out these experiments, one glass taking as much as a year of work to get some idea of the temperature at which it should be annealed, and it being simply an accident when the actual temperature was found.

This prior art procedure, which not only required considerable time and expense, and which did not assure accuracy, has been completely eliminated by the present invention through the provision of simple, efficient and economical means of directly and scientifically determining the actual annealing temperatures required for particular glasses.

The procedure followed by the present invention is based on the following theory:

Glass when it is in a fluid state has one type of arrangement of the atoms. Glass when it is in its utmost compacted state has another arrangement of the atoms. The first arrangement, or the fluid arrangement, is called the beta arrangement and the compacted arrangement may be called the alpha arrangement. If glass in the beta arrangement is cooled extremely rapidly, the beta arrangement is frozen into the glass to a certain extent and will remain for some time, maybe 100 years slowly changing to the alpha state, at ordinary room temperature. The period of time is practically unknown and simply a guess extrapolated from short intervals of time. Glass in the completely compacted or alpha form remains constant at room temperatures because such glass is stable at room temperatures. Time, therefore, has no effect upon it. This provides an ideal glass. At temperatures somewhat above room temperature but way below the softening point of the glass, the beta form of the glass changes into the alpha form more rapidly, and at still higher temperatures the change occurs still more rapidly until a certain maximum temperature is reached where the alpha form of glass desires to change back into the beta form, so that a mixture of alpha and beta glasses exists. It is, therefore, essential that in the most rapid annealing of glass we find the temperature at which beta glass changes into alpha glass with the utmost speed and no alpha glass tries to get back into the beta form. This temperature is the desired lower annealing temperature.

Referring to the drawings.

Referring more particularly to the drawings wherein like characters of reference designate like parts throughout the several views, the method embodying the invention is carried out substantially as follows.

Figures 1, 2:
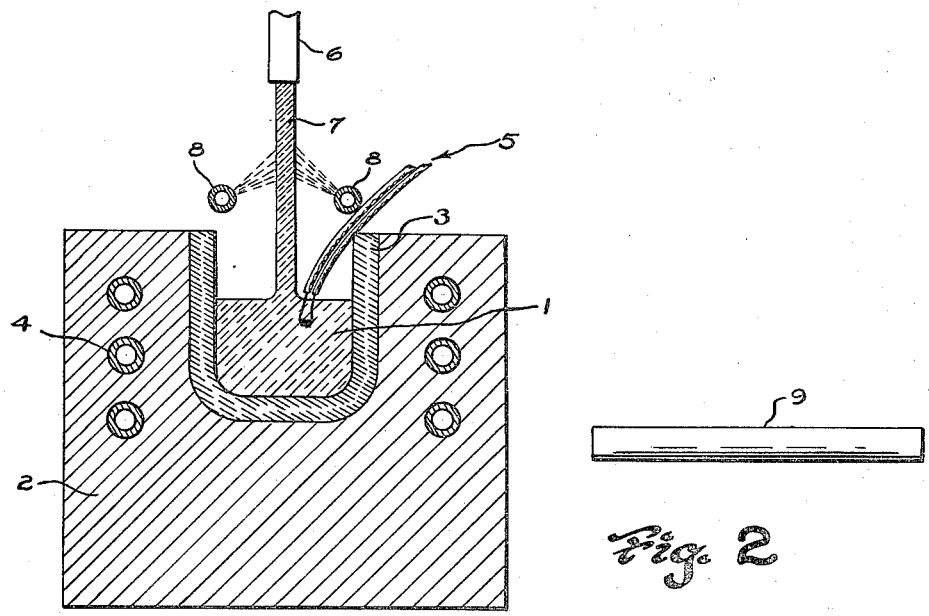
Fig. 1 is a diagrammatic view illustrating one step of the process of manufacture.
Fig. 2 illustrates a bar of glass to be tested.

The glass 1 which is to be tested is placed in a suitable heating unit 2, which may be an ordinary small electric furnace having a crucible 3 adapted to be heated by a suitable electric heating coil or the like 4. It is to be understood that this is merely given by way of illustration, as any other suitable means of melting the glass and of controlling its temperature may be employed. In this particular instance the temperature of the furnace is obtained by means of a thermocouple or the like 5. When the glass has reached a suitable molten state, preferably of a viscous consistency, such as may be drawn into a rod, a ceramic bait 6 is pressed on the surface of the viscous glass and is then slowly drawn upwards causing a bar 7 of said glass to be formed. While the bar 7 is being drawn from the base batch 1 it is preferably chilled by suitable air jets or the like 8. It is desirable to control the rate of drawing of the bait 6 by a geared down electric motor so it will be slow enough to form the desired bar. A practical speed is about 3 ft. per minute. This causes the bar 7 to be substantially uniform and cooling is sufficiently rapid so that the glass of the bar 7 is largely in the beta form. From the bar 7 a test piece 9 is cut to a length suitable for use in an instrument for measuring the coefficient of expansion of the particular glass.

A practical device for measuring the coefficient of expansion is what is commonly known as a Chevenard dilatometer, which is described in the pamphlet "Dilatometre Differentiel A Enregistrement Photographique" by Systeme P. Chevenard, put out by the R. Y. Ferner Co., Division of The Osgood Engineering Co., Boston, Massachusetts, and for this particular instrument the bar 9 is about 2" in length and about ⅛" in diameter. The Chevenard dilatometer is particularly useful for this purpose because the changes in length of the test bar are photographically recorded and are highly magnified with said automatic recordings obviating the necessity of an observer being present.

Figure 3:
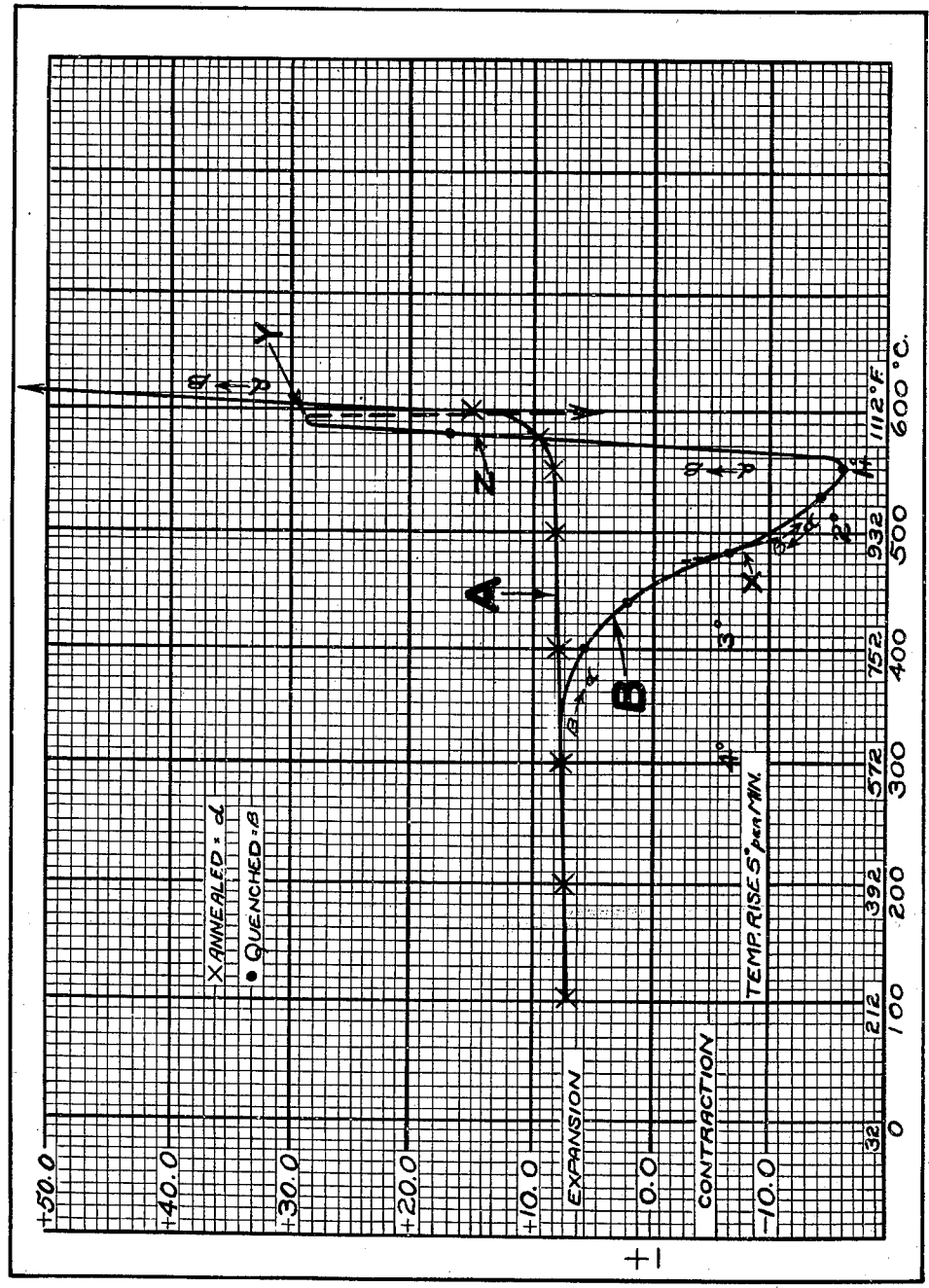
Fig. 3 is a chart illustrating the coefficient of expansion curve of a particular chilled (uncompacted) glass from which the upper and lower annealing temperatures which give the temperature range of annealing can be obtained and also giving the coefficient of expansion curve of an annealed (compacted) glass.

The dilatometer is a well-known instrument which embodies fused quartz for the specimen holder with a standard of expansion whose thermal expansions are regular and known accurately such as Pyros with fused quartz presser bars resting on the standard and on the glass specimen and moving a mirror so that a change in temperature is recorded by a horizontal movement produced by the Pyros bar and the difference in expansion between the Pyros and the glass bar is recorded as a vertical movement by the spot of light on the photographic plate. Pyros composition is given in "Engineering Alloys by Woldman and Dornblatt" published by American Society of Metals, page 156, No. 1457. As a result, there is a photographic trace on the plate showing the difference in length of glass minus Pyros vertically, and showing horizontally the temperature at which this difference has occurred. As a result of this, and knowing the constants of the instrument, one can compute the coefficient of expansion of the unknown at any temperature by measuring the angle of the tangent to the curve at the desired temperature and performing the necessary computations. These depend upon the constants of the particular instruments used. Therefore, the coefficient of expansion may be plotted for all temperatures from room temperature up to where the glass softens and flows viscously. From such coefficients of expansion computations the charts in Fig. 3 have been plotted. In said chart the curved line B gives the coefficient of expansion of the quenched test specimen 9 for different temperatures determined from the dilatometer photographic curve. Curved line A gives the thermal expansion coefficients for a compacted, completely annealed bar of the same glass. The glass shown on these charts is a typical borosilicate crown.

Let us consider curve A, or the well compacted glass. The coefficient of expansion of this glass increased just a little from 100° C. up to roughly 500° C. with no observed irregularities. Above this point a little change is occurring in curve A and around 570° C. this glass begins to expand very rapidly because it is changing exceedingly fast to beta glass from the alpha glass, as will be noted by the sharp up turn of the line A at approximately 600° C.

Let us now consider curve B which is of the quenched glass or glass with a high percentage thereof in beta form. The coefficients of expansion at 100°, 200° and 300° are almost on a uniform line and practically identical with curve A. The glass will actually be contracting a little with reference to the completely compacted glass, even at these temperatures but the amount is too small to be shown. Above 300° one can see that this almost straight line has become a downward curve and instead of continuing to expand the same as curve A it is expanding less rapidly until at about 460° the glass is actually contracting and increasing in its contraction rate until it reaches approximately 480°. This shows that the beta glass is changing to the more compacted state of the alpha glass at an increasingly rapid rate until it reaches the 480° point.

At a temperature of approximately 480° or 490° C. there is a point of inflection X in the coefficient of expansion curve. At this point the rate of decrease in the coefficients of expansion is such that instead of an increasing rate of decrease, the rate of decrease becomes constant and is followed by a decreasing rate of decrease until the rate of decrease becomes zero at about 550° C. per increment of temperature increase. There then occurs a very rapid rate of increase in the coefficients of expansion until a temperature of about 590° C. is reached where physical deformation occurs. With a sample from the same glass less completely changed to beta glass there would not always be an actual contraction as the temperature is increased but the curve would have the same general characteristics with the point of inflection X at practically the same location on the chart as to temperature, but with the numerical changes in the coefficients of expansion being less.

It is, therefore, apparent that in order to cause B to be more pronounced as shown in the chart, the glass with a high percentage thereof in beta form is desirable.

The point at approximately 480° where the inflection of the curve B occurs I have found to be the lower annealing temperature of the glass, that is the point where the beta changes into the alpha with the utmost rapidity and without the tendency to change back into beta again.

The temperature of distortion on this glass is easily seen to be the point Y on the curve B where the curve rapidly goes downward at approximately 590° C. because this is the point at which the slight pressure of the quartz bars in the dilatometer actually compress the glass as if it were very stiff pitch and a steady flow of the glass occurs. Therefore, the upper annealing temperature must be below this point or distortion will occur. It has been found that a very good upper annealing point is approximately where a prolongation of the straight portion of the curve B would intersect the actual curve B or at a temperature slightly above as at Z which is slightly below the melting point Y.

The figures on the left-hand side of this chart are the actual coefficient of expansion of this glass. The figures on the bottom of this chart are the temperatures in centigrade and Fahrenheit. The figures just above the temperatures are the rates at which the specimen was heated in the dilatometer.

The particular glass described here is an ordinary borosilicate crown having a maximum index of refraction slightly above 1.5173 and a reciprocal relative dispersion of 64 when compacted. A brief outline of the changes that can occur in the refractive index of this glass is: When quenched, the index of refraction is approximately 1.511. Ordinary annealing of this particular glass gives an index of refraction of approximately 1.5167. Somewhat better annealing gives an index of 1.5170. Complete annealing of this glass according to the teachings of the present invention gives an index slightly above 1.5173. The variation in this index shows how important it is to compact the glass. Heavy bars of glass having a total length of say 80 mm. such as are used for rough prisms show less than $\frac{1}{8}$ wave length difference in the optical path length when going through the bar, which shows that an extreme uniformity of index has been obtained, which is essential for the highest quality of imagery.

It is to be understood that although only one glass has been described, this method of obtaining annealing temperatures has been found to apply to all glasses. The data given has been obtained from one borosilicate crown glass of index 1.517, dispersion 64 but this data may or may not apply to other borosilicate crown of other compositions even if they have the same index and dispersion. Each type or batch composition must be measured and no generalizations can be permitted.

While the method disclosed will give the upper annealing point, that is, the point at which strain is rapidly released there are other methods of obtaining this upper temperature such as observing the release of strain when the glass is of a high temperature in the furnace as, for example, by the use of regular polarized light means.

From the foregoing description it will be seen that simple, efficient and economical means and methods have been provided for accomplishing all of the objects and advantages of the invention.

Having described my invention, I claim:

The method of annealing glass comprising subjecting said glass to an initial high temperature which is below the point of melting or rapid distortion of the glass and reducing said temperature slowly until the temperature is that of an optimum compacting temperature indicated as being the point of inflection reached in a plotted curve of the coefficient of expansion of a specimen of quenched glass, which optimum temperature is the highest temperature at which all of the glass can change from high temperature or low index form to low temperature or high index form and which temperature is the lowest holding temperature for the particular glass being annealed, holding said temperature for a predetermined time and subsequently cooling.

EDGAR D. TILLYER.

REFERENCES CITED

The following references are of record in the file of this patent:

UNITED STATES PATENTS

| Number | Name | Date |
|---|---|---|
| 1,585,542 | Henry | May 18, 1926 |
| 1,434,268 | Tillyer | Oct. 31, 1922 |
| 2,147,418 | Bahls | Feb. 14, 1939 |
| 2,148,630 | Lillie et al. | Feb. 28, 1939 |
| 2,167,482 | Hull et al. | July 25, 1939 |
| 2,269,597 | Mitford | Jan. 13, 1942 |
| 2,285,595 | Littleton et al. | June 9, 1942 |
| 1,071,331 | Mulholland | Aug. 26, 1913 |
| 1,540,264 | Henry | June 2, 1925 |
| 2,062,836 | Scott | Dec. 1, 1936 |

FOREIGN PATENTS

| Number | Country | Date |
|---|---|---|
| 431,095 | Britain | July 1, 1935 |